United States Patent [19]

Breen

[11] Patent Number: 5,380,072

[45] Date of Patent: Jan. 10, 1995

[54] TRAILER STABILITY SYSTEM AND METHOD

[75] Inventor: Michael T. Breen, Garden City, Mich.

[73] Assignee: Eaton Corporation, Cleveland, Ohio

[21] Appl. No.: 184,798

[22] Filed: Jan. 21, 1994

[51] Int. Cl.⁶ .............................................. B60T 7/20
[52] U.S. Cl. ........................................ 303/7; 303/20;
303/111; 280/428; 364/426.02
[58] Field of Search .................... 280/428, 432; 303/7,
303/8, 20, 91, 96, 100, 103, 111, 118.1;
364/426.02

[56] References Cited

U.S. PATENT DOCUMENTS

| | | | |
|---|---|---|---|
| 4,620,717 | 11/1986 | Ivory et al. | 280/432 |
| 4,768,840 | 9/1988 | Sullivan et al. | 303/100 X |
| 4,919,494 | 4/1990 | Higashimata et al. | 303/100 |
| 5,001,639 | 3/1991 | Breen | 303/7 X |
| 5,022,714 | 6/1991 | Breen | 303/7 |
| 5,029,948 | 7/1991 | Breen et al. | 303/7 |
| 5,033,798 | 7/1991 | Breen | 303/7 |

Primary Examiner—Robert J. Oberleitner
Assistant Examiner—Alfred Muratori
Attorney, Agent, or Firm—L. J. Kasper

[57] ABSTRACT

A trailer stability brake control method is disclosed for an articulated vehicle 11 which involves determining values indicative of tractor turning radius of curvature (TRC), articulation angle (AA) and time derivatives thereof, a value for wheel speed variance (WSV) is determined, and then a stability indicator (SI) is determined for each of TRC and AA, and the time derivatives thereof. The later step is performed by signal processing means (63) including filter means having a cutoff frequency ($\Omega_c$) with the cutoff frequency decreasing as the wheel speed variance increases, and vice versa. The trailer brake control means (125) is de-actuated whenever the stability indicator (SI) relating to the articulation angle (AA) becomes less than the wheel speed variance.

4 Claims, 5 Drawing Sheets

TRAILER STABILITY SYSTEM AND METHOD

BACKGROUND OF THE DISCLOSURE

The present invention relates to a system and method for maintaining the stability, during braking, of a towed subvehicle in an articulated vehicle system, such as the semitrailer in a tractor-semitrailer system, and more particularly, to such a system and method for determining when to de-actuate or release the brakes, and whether to de-actuate or release the tractor brakes or the trailer brakes.

Brake control systems for all types of vehicles, including heavy-duty-tractor semitrailer articulated trucks, to improve the stopping and vehicle stability thereof, are now well known to those skilled in the art.

Brake systems of the anti-lock type, for all types of vehicles, are now well known in the prior art. Briefly, these systems operate to maintain vehicle stability (i.e., maintain an acceptable transverse co-efficient of friction of the braked wheels) by keeping the longitudinal slip of the braked wheels within a predetermined limit. Such control of the longitudinal slip usually requires modulating the braking forces on an individual wheel and/or individual axle basis, to permit at least some wheel rotation. Examples of prior art anti-lock brake ("ABS") systems may be seen by reference to U.S. Pat. Nos. 3,767,270; 3,854,556; 3,929,383; 3,966,267; 4,392,202; and 4,591,213, the disclosures of all of which are hereby incorporated by reference.

Brake systems for heavy-duty articulated vehicles, such as tractor-semitrailer trucks, are difficult to design, because the loading will vary substantially. For example, the loading on the tractor of a tractor-trailer may comprise the tractor only; the tractor with an empty or lightly loaded trailer, or the tractor with a heavily laden trailer. Furthermore, articulated tractor-trailer vehicles are, by their very nature, capable of exhibiting certain unstable dynamic behaviors, examples of which are "jackknife" and "trailer swing", each of which has its own characteristic cause, effect, and sequence of appropriate actions. Jackknife is sometimes referred to as "tractor brake caused jackknife", while trailer swing is sometimes referred to as "trailer brake caused jackknife". In other words, trailer instability may result from braking action at either the tractor or the trailer.

SUMMARY OF THE INVENTION

Accordingly, it is an object of the present invention to provide an improved trailer stability brake control system and method which is capable of determining that a trailer instability condition is about to occur, and doing so with a substantially greater degree of confidence before taking corrective action.

It is a related object of the present invention to provide such an improved trailer stability brake control system and method which requires the measurement of only the wheel speed of each of the tractor wheels, and the articulation angle defined by the tractor and the trailer.

Various systems and methods to control articulation angle and to minimize trailer swing and instability have been proposed and are now known to those skilled in the art. Examples of such systems and methods are shown in U.S. Pat. Nos. 5,001,639; 5,005,130; 5,022,714; and 5,029,948, all of which are assigned to the assignee of the present invention and incorporated herein by reference.

Although the systems and methods described in the above-incorporated patents represented a substantial improvement over the then-known prior art, and have been shown to be generally satisfactory, there has not always been sufficient correlation between an incipient unstable condition and the particular system parameter being measured, as an indication of the incipient instability. For example, it was difficult for the known prior art systems to detect an incipient instability by direct measurement of articulation angle. If too small an articulation angle were used as the "standard", the level of confidence in the occurrence of an instability condition would be quite low. On the other hand, if too large an articulation angle were used as the standard, by the time the standard was detected, the instability condition could very well be beyond recovery.

Accordingly, it is another object of the present invention to provide an improved trailer stability brake control system and method having a substantially increased "level of confidence" in regard to detection of an incipient instability condition, while still detecting the condition early enough to permit effective corrective action to be taken.

The above and other objects of the invention are accomplished by the provision of an improved trailer stability brake control method for an articulated vehicle of the type including a tractor and a trailer connected at an articulating connection (fifth wheel/kingpin), defining a pivot axis about which the trailer is pivotable relative to the tractor. An articulation angle of the vehicle is defined by the included angle, defined by a longitudinally-extending axis of the trailer passing through the pivot axis, relative to a longitudinally-extending axis of the tractor passing through the pivot axis. The tractor includes at least first and second axles having at least first and second left wheels and first and second right wheels. A tractor brake system includes a tractor brake control means and a trailer brake system includes a trailer brake control means.

The improved control method is characterized by:
  (a) determining a value indicative of at least one of a tractor turning radius of curvature (TRC) and a time derivative of tractor turning radius of curvature ($d^n TRC/dt^n$) for each of the first and second tractor axles;
  (b) determining a value indicative of at least one of the articulation angle (AA) and a time derivative of the articulation angle ($d^n AA/dt^n$);
  (c) determining a value (WSV) indicative of wheel speed variance ($WSV_L$) between the first and second left wheels, and of wheel speed variance ($WSV_R$) between the first and second right wheels;
  (d) providing signal processing means to determine a value indicative of a stability indicator ($SI_T$, $SI_A$) for each of the values determined in steps (a) and (b) above, wherein each signal processing means includes filter means having a cut-off frequency ($\Omega_c$), the cut-off frequency is a function of wheel speed variance (WSV) such that, the cut-off frequency $\Omega_c$ decreases as the wheel speed variance (WSV) increases, and vice-versa; and
  (e) de-actuating the trailer brake control means whenever the stability indicator ($SI_A$) for one of the articulation angle (AA) and the time derivative ($d^n AA/dt^n$) thereof becomes less than a said wheel speed variance (WSV).

DESCRIPTION OF THE PREFERRED EMBODIMENT

Figure 1:
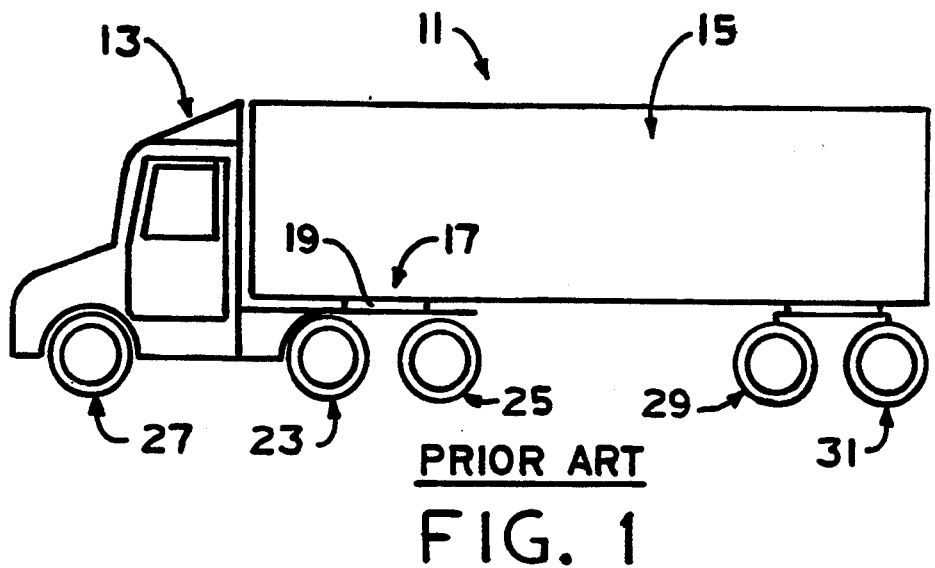
FIG. 1 is a schematic illustration of a conventional heavy-duty tractor-semitrailer articulated truck.

Referring now to the drawings, which are not intended to limit the invention, FIG. 1 illustrates a tractor-trailer articulated truck, generally designated 11, of the type with which the trailer stability brake control system and method of the present invention may be utilized. Briefly, as is well known to those skilled in the art, the truck 11 comprises a tractor 13 and a trailer 15, attached thereto by a connecting means, generally designated 17. Typically, the connecting means 17 comprises a well known fifth wheel 19 (see also FIG. 4), fixed to the tractor 12 for selective engagement with a kingpin 21 (see FIG. 3), which is fixed to the trailer 15.

The tractor 13 typically comprises a pair of, or tandem set of, rear drive axle assemblies 23 and 25, and a front steer axle 27. The trailer 15 typically comprises a pair of, or tandem set of, non-steerable, non-driven trailer axle assemblies 29 and 31. Typically, but not necessarily, the front steer axle 27 will include non-driven steerable wheels, and the tractor 13 and/or the trailer 15 may be equipped with only a single axle assembly, or with more than two axle assemblies.

Those skilled in the art will understand that, as used herein, the term "trailer" is intended to include various types of trailed subvehicles, and the present invention is not limited to any particular type or configuration of subvehicle. All that is essential for purposes of the present invention is that there be a steerable main vehicle, such as the tractor 13, and a trailed subvehicle, such as the trailer 15. It is also essential to the present invention that the main and trailed vehicles be articulated, as will be illustrated and described subsequently.

As is also now well known to those skilled in the art, the combination of the fifth wheel 19 and the kingpin 21 makes it possible to couple or connect, on a relatively quick and easy basis, a standardly equipped tractor and a standardly equipped trailer, in an articulated or pivoted manner. However, under certain conditions, often associated with braking while on a curve or in a turn, the tractor 13 and/or the trailer 15 may lose transverse stability, resulting in a condition of uncontrolled, excessive articulation (i.e., either "jackknife" or "trailer swing").

As was discussed in the BACKGROUND OF THE DISCLOSURE, jackknife usually results from the tractor drive wheels losing transverse stability, often while cornering. This condition is likely to be compounded if the tractor is pulling a trailer which is heavily loaded, thus having an inertia substantially greater than that of the tractor. By way of contrast, trailer swing generally results from the wheels on the trailer axle assemblies 29 and 31 losing transverse stability, again usually during cornering.

In the case of either jackknife or trailer swing, it is desirable, upon sensing the incipient condition, to take effective corrective action to prevent the condition from developing further, for example, to minimize the extent of the trailer swing and cause the trailer to resume its normal tracking condition.

As is now well known, decreasing the longitudinal slip of a tire will increase the transverse coefficient of friction thereof. Accordingly, trailer swing induced by nearly locked trailer brakes, if sensed at the onset thereof, may be reduced by increasing the transverse stability of the wheels on the trailer axle assemblies 29 and 31. One way this may be done is by releasing the brakes on the axle assemblies 29 and 31, and allowing the associated wheels to roll up to, or toward normal vehicle speed. The purpose of the trailer stability brake control system and method of the present invention is to prevent the occurrence of, or to minimize the extent of, both tractor brake induced jackknife and trailer brake induced trailer swing events.

The trailer stability brake control method and system of the present invention is preferably utilized with a tractor 13 fully equipped with an ABS system and a trailer 15 equipped with a standard, i.e., non-ABS brake system. However, the control of the present invention would also be beneficial if utilized on a vehicle having both tractor and trailer ABS because, under certain conditions, undesirable trailer articulation may occur, even though the vehicle wheels have not yet locked up to the extent necessary to cause corrective action by the typical, currently available ABS systems. In addition, although not preferred, the trailer stability brake control system and method of the present invention can provide a degree of improved vehicle stability, even when utilized on a tractor-trailer, wherein neither the tractor nor the trailer is provided with an ABS system.

Figure 2:
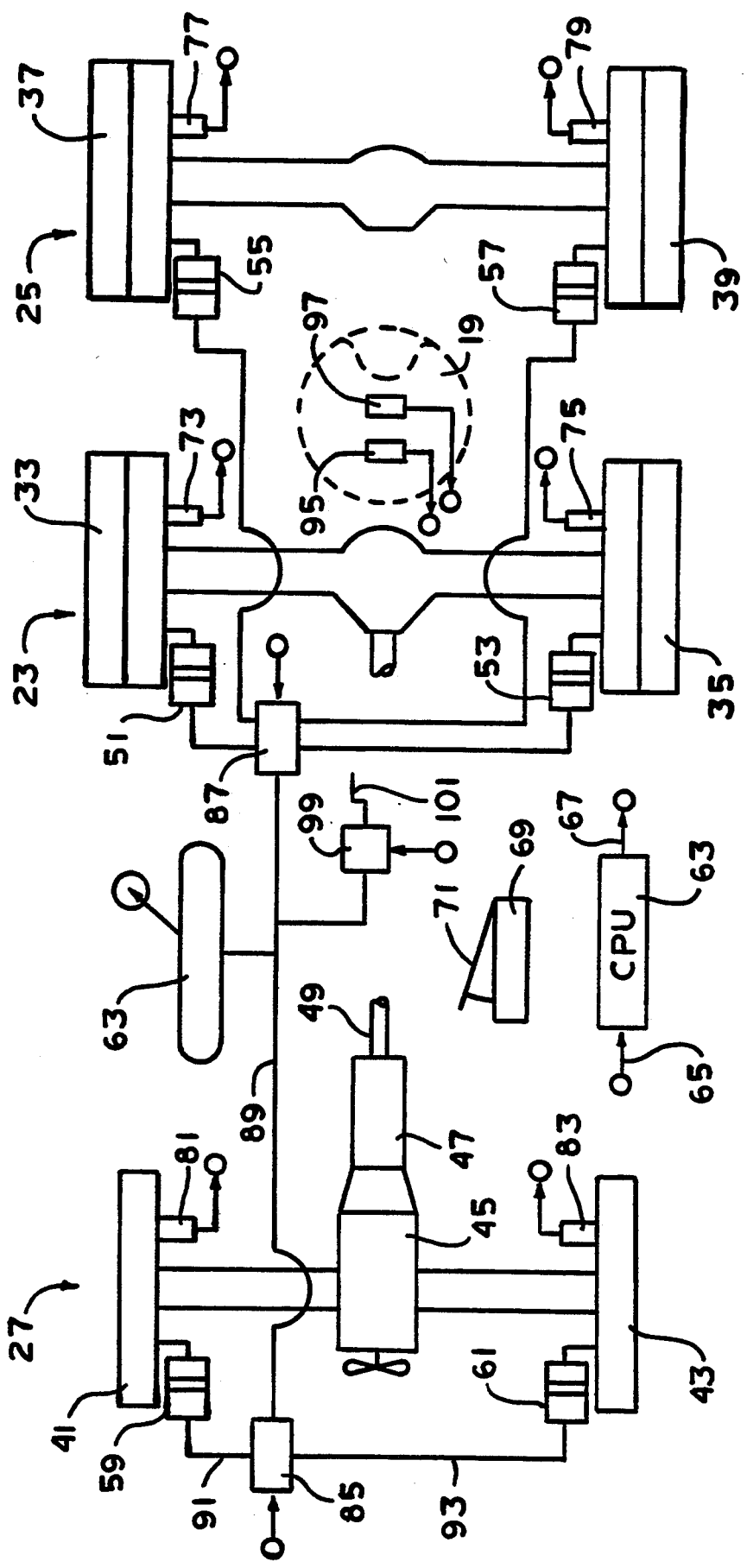
FIG. 2 is a schematic illustration of a tractor-mounted brake control system, including both a conventional anti-lock brake (ABS) system, as well as the trailer stability system of the present invention.

A braking system for the tractor 13 of an articulated truck 11, which utilizes the system and method of the present invention may be seen by reference to FIG. 2. It should be noted that although the braking system for the tractor 13 shown in FIG. 2 is of the "brake-by-wire" type, the present invention is equally applicable with other types of brake controls and ABS systems.

The rear drive axle assembly 23 includes wheels 33 and 35, while the rear drive axle assembly 25 includes wheels 37 and 39. The front steer axle 27 includes wheels 41 and 43. The rear drive axle assemblies 23 and 25 are driven by an engine 45 through a transmission 47 and a driveline 49 (shown fragmentarily in FIG. 2).

Air actuated brake devices 51, 53, 55, and 57 are provided for retarding the rotation of wheels 33, 35, 37, and 39, respectively. Similar air actuated brake devices 59 and 61 are provided for retarding the rotation of the wheels 41 and 43, respectively, of the front steer axle 27. In the system illustrated, the brake devices 51 through 61 may be air actuated brakes of any one of the well known types, such as the "S" cam actuated brake type, or the air disc brake type, the details of which are well known in the prior art, and may be seen in greater detail by reference to U.S. Pat. Nos. 4,476,968 and 4,457,407, the disclosures of both of which are incorporated herein by reference. While both the front brake devices 59 and 61, and all of the rear brake devices 51 through 57 should be of the same size and type, it is not necessary, and not preferable, that the front and rear brake devices be of the same size.

Compressed air for actuating the brakes is supplied from a plurality of supply tanks 62 only one of which is shown, which supply tanks are provided with compressed air from the vehicle's on-board compressor (not shown herein) or another suitable source of air pressure. The braking system also includes a control unit 63 which, for purposes of flexibility and responsiveness, is preferably an electronic microprocessor-based control unit. The unit 63 has an input means 65 for receiving a plurality of input signals, and means for processing the input signals in accordance with predetermined logic rules. The unit 63 further comprises output means 67 for issuing command signals to various elements of the braking system. Units such as the control unit 63 are well known in the prior art, as may be seen by reference to U.S. Pat. No. 4,595,986, the disclosure of which is incorporated herein by reference.

A sensor 69 senses the displacement by the operator of a brake pedal 71 and provides an input signal indicative of the driver's demand or the vehicle stopping effort. Sensors of this type are known in the prior art, as may be seen by reference to U.S. Pat. Nos. 4,140,352; 4,327,414; and 4,512,615, the disclosures of which are incorporated herein by reference. Typically, such sensors will sense the displacement of and/or force applied to the brake pedal 71, and will provide an output signal proportional thereto. The present invention is equally applicable to the more conventional brake systems, wherein the amount of braking effort is controlled by a well known treadle.

In order to provide the tractor 13 with ABS operation, wheel speed sensors 73.75, 77, 79, 81, and 83 are provided for generating input signals indicative of the rotational speeds of wheels 33, 35, 37, 39; 41, and 43 respectively. The control unit 63, as is now well known in the ABS art, processes the input signals from the wheel speed sensors 73 through 83 in accordance with predetermined logic rules, to generate command output signals to a front control valve 85 and to a rear control valve 87. The front control valve 85 is connected to the supply tank 62 through a supply line 89 and, in accordance with the command output signals from the control unit 63, independently pressurizes conduits 91 and 93, leading to air brakes 59 and 61, respectively. The rear control valve 87 is also connected to the supply tank 62 through the supply line 89, and, in accordance with command output signals from the control unit 63, individually pressurizes branch conduits to the air brakes 51, 53, 55, and 57. Accordingly, it may be seen that the braking efforts at each of the tractor wheels 33 through 43 may be individually controlled, for ABS purposes, in a closed-loop manner, in response to command output signals generated by the control unit 63.

To provide the trailer stability brake control method and system of the present invention, the tractor braking system is also provided with one or more sensors 95 and 97, preferably mounted on the tractor, such as at the fifth wheel 19. The sensors 95 and 97 provide input signals to the control unit 63, indicative of, and/or allowing the calculation of, the current articulation angle (AA), and of time derivatives thereof, such as the rate of change of articulation angle (dAA/dt), and even the second derivative, or the rate of change of the rate of change of articulation angle ($d^n AA/dt^n$). Alternatively, sensors may be provided for directly sensing the first derivative and/or the second derivative of the articulation angle (AA). In addition, a control valve 99, controlled by command outputs from the control unit 63, will provide pilot controls to the standard trailer brake system control valve. Preferably, the control valve 99 is located on the tractor just upstream of a gladhand connector 101, which will be referred to again subsequently.

Figure 3:
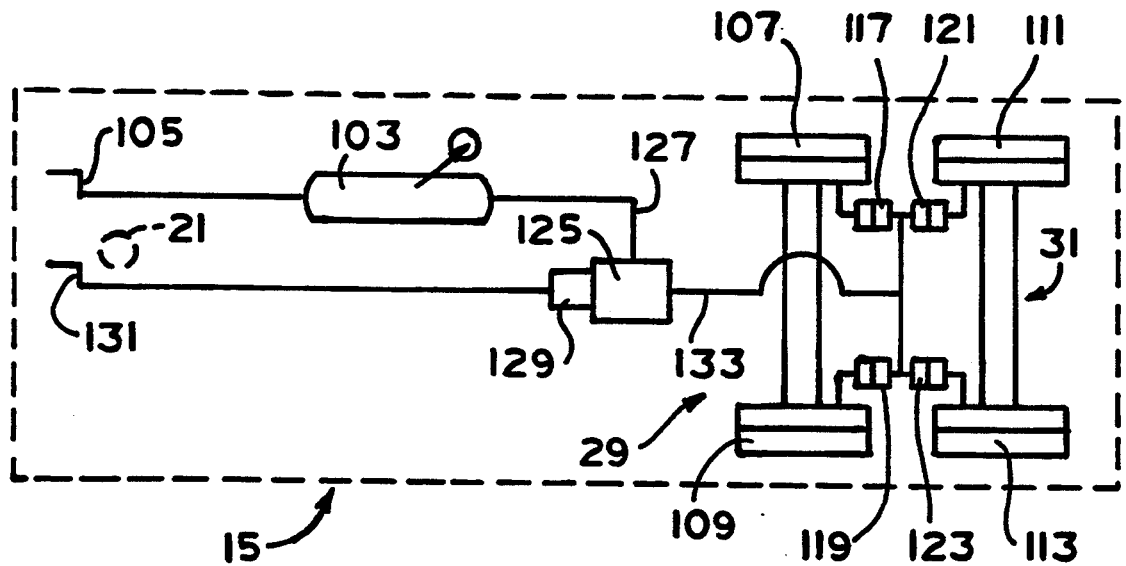
FIG. 3 is schematic illustration of a conventional (PRIOR ART) trailer brake system which may be utilized with the trailer stability brake control system of the present invention.

Referring now primarily to FIG. 3, a PRIOR ART standard trailer brake system (i.e., non-ABS) is illustrated. Briefly, the trailer includes the kingpin 21 for selective engagement and dis-engagement to the tractor fifth wheel 19. The trailer 15 includes a supply tank 103 connected to the tractor air system by means of a fluid connection 105. The trailer axle assemblies 29 and 31 support trailer wheels 107, 109, 111, and 113, each of which is provided with an air-actuated brake device 117, 119, 121, and 123, respectively. Typically, all of the trailer brakes are controlled at the same pressure by means of a relay valve 125, which has an inlet 127 connected to the trailer supply tank 103. The relay valve 125 also includes a pilot valve portion 129 for receiving a pilot air signal from the tractor air system by means of a connector 131. Each of the trailer brakes is actuated at approximately the same pressure from a single output 133 from the pilot operated relay valve 125. The connector 131 is designed to cooperate with the connector 101 on the tractor to form a fluid connection commonly referred to as the "gladhand".

Figure 4:
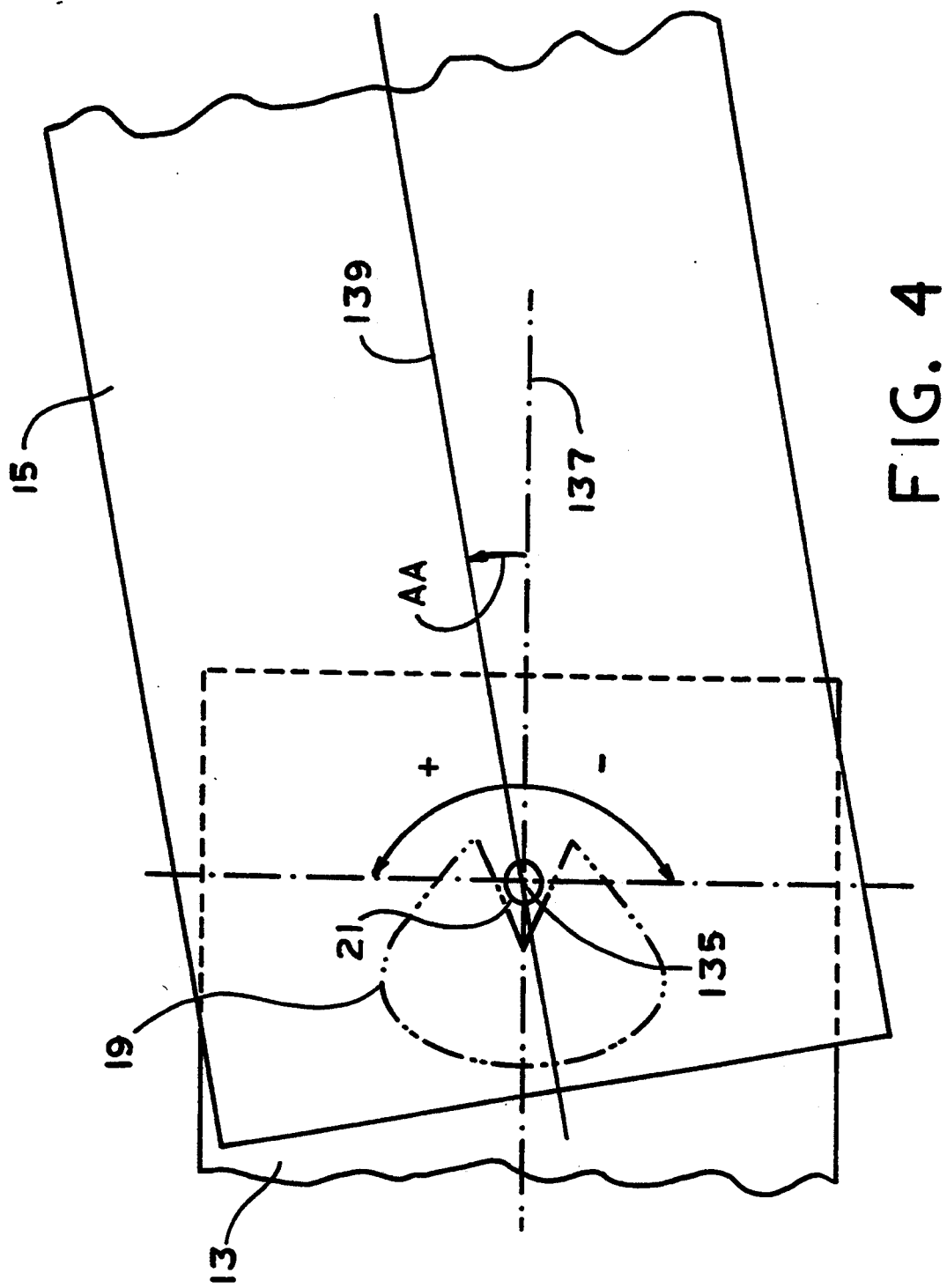
FIG. 4 is an enlarged, fragmentary, schematic illustration of the kingpin/fifth wheel pivotal connection between a tractor and a trailer, illustrating the definition of the tractor-trailer articulation angle (AA).

Applicant's convention to be used throughout this application for the measurement of articulation angle (AA) may best be understood by reference to FIG. 4. A pivot axis 135 between the tractor 13 and trailer 15 is defined by the fifth wheel 19 and the kingpin 21, as viewed from the top of the vehicle, and with the trailer extending rearwardly from left to right, as shown in FIG. 4. The articulation angle (AA) between the tractor and trailer is defined as the included angle between a longitudinal axis 137 of the tractor 113, passing through the pivot axis 135, and a longitudinal axis 139 of the trailer 15, also passing through the pivot axis 135. The articulation angle (AA) is measured as shown in FIG. 4 from the tractor longitudinal axis 137 to the trailer longitudinal axis 139, and is assigned a positive value in the counterclockwise direction, and a negative value in a clockwise direction. Thus, in the example shown in FIG. 4, the articulation angle (AA) would have a positive value.

Figure 5:
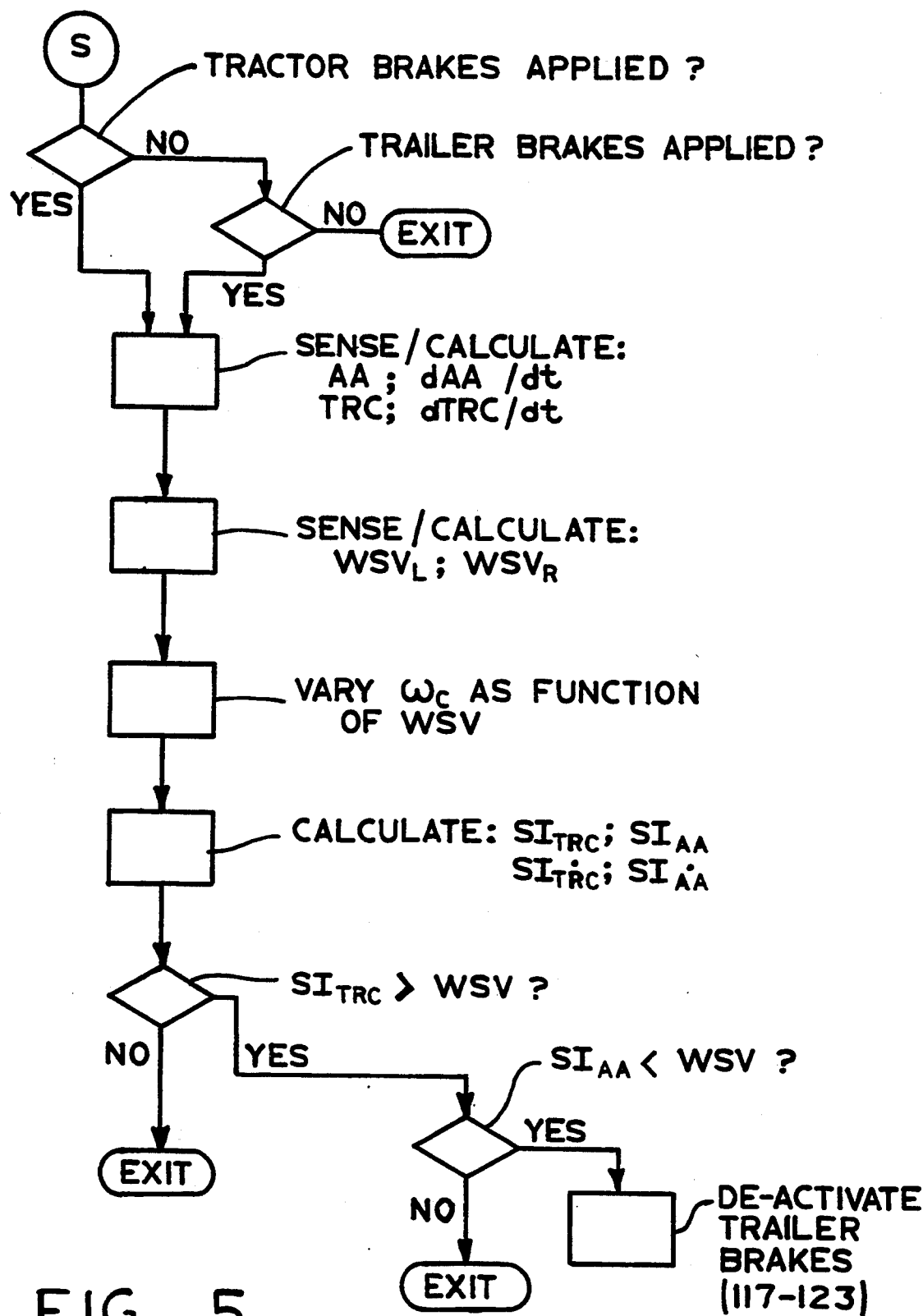
FIG. 5 is a schematic illustration, in the form of a flow chart, of the trailer stability brake control system/method of the present invention.

Referring now primarily to FIG. 5, the method for controlling the brakes of an articulated vehicle, in accordance with the present invention, will be described in some detail. At the start of the control logic, the sensor 69 is interrogated to determine whether or not the tractor brakes have been applied. If they have ("YES"), the logic proceeds to the next operation. If not ("NO"), the logic then interrogates appropriate sensors to determine if the trailer brakes have been applied. If they have ("YES"), the logic proceeds to the next operation, but if they have not ("NO"), the logic is exited.

If either the tractor or trailer brakes have been applied, the next operation is to sense (or calculate) the articulation angle (AA), and a time derivative thereof ($d^n AA/dt^n$). At the same time, the turning radius of curvature (TRC) is sensed (and/or calculated), as is a time derivative thereof ($d^n TRC/dt^n$).

Subsequently, the logic interrogates the wheel-speed sensors 73 through 83, and calculates the wheel-speed variance among all of the left wheels 35, 39, and 43, and at the same time, calculates the wheel-speed variance among all of the right wheels 33, 37, and 41. The particular method to be used for calculating the wheel speed variance between or among the wheels on the tractor 13 is not an essential feature of the invention, and it is believed to be within the ability of those skilled in the art to adopt a suitable means of calculating the variance. From this point onward, the logic utilizes only an "overall" wheel speed variance, which may be the lower of the left and right variances, or the higher of the variances, or the average thereof. In the subject embodiment, wheel speed variance (WSV) is the lower of the left and right variances.

The next step in the logic has to do with the "calculation" of various stability indicators (SI), which will be described subsequently. In the subject embodiment, the calculation or determination of the stability indicators involves the use of an adaptive low-pass filter circuit having a particular cut-off frequency ($\Omega_c$). Therefore, the logic proceeds to vary the cut-off frequency ($\Omega^c$) as an inverse function of wheel speed variance (WSV), i.e., as wheel speed variance (WSV) increases, the cut-off frequency ($\Omega^c$) decreases, and vice versa. It is believed to be within the ability of those skilled in the art to provide an appropriate algorithm and/or filter circuit to calculate and/or determine a stability indicator suitable for use in the system and method of the present invention.

The next step in the logic is to calculate the stability indicator (SI) for the articulation angle (AA), for the time derivative thereof ($d^n AA/dt^n$), for the turning radius of curvature (TRC), and for the time derivative thereof ($d^n TRC/dt^n$). It should be understood in connection with the subsequent discussion of stability indicator (SI) that, as used hereinafter, the term "stability indicator" means an indicator which increases in absolute value as the particular quantity becomes more stable, i.e., more constant as a function of time.

In calculating the stability indicator (SI) for each of the quantities designated, use is made, typically in the control unit 63, of some form of signal processing means, such as a low-pass filter, which could be a first order filter. The details of the filter are not an essential feature of the invention, and it is believed to be within the ability of those skilled in the art to select the appropriate filter parameters in view of the subsequent description. It should also be understood that the filter arrangement is preferably duplicated, such that the stability indicator (SI) for each of the four quantities can be calculated or determined simultaneously.

Figure 6:
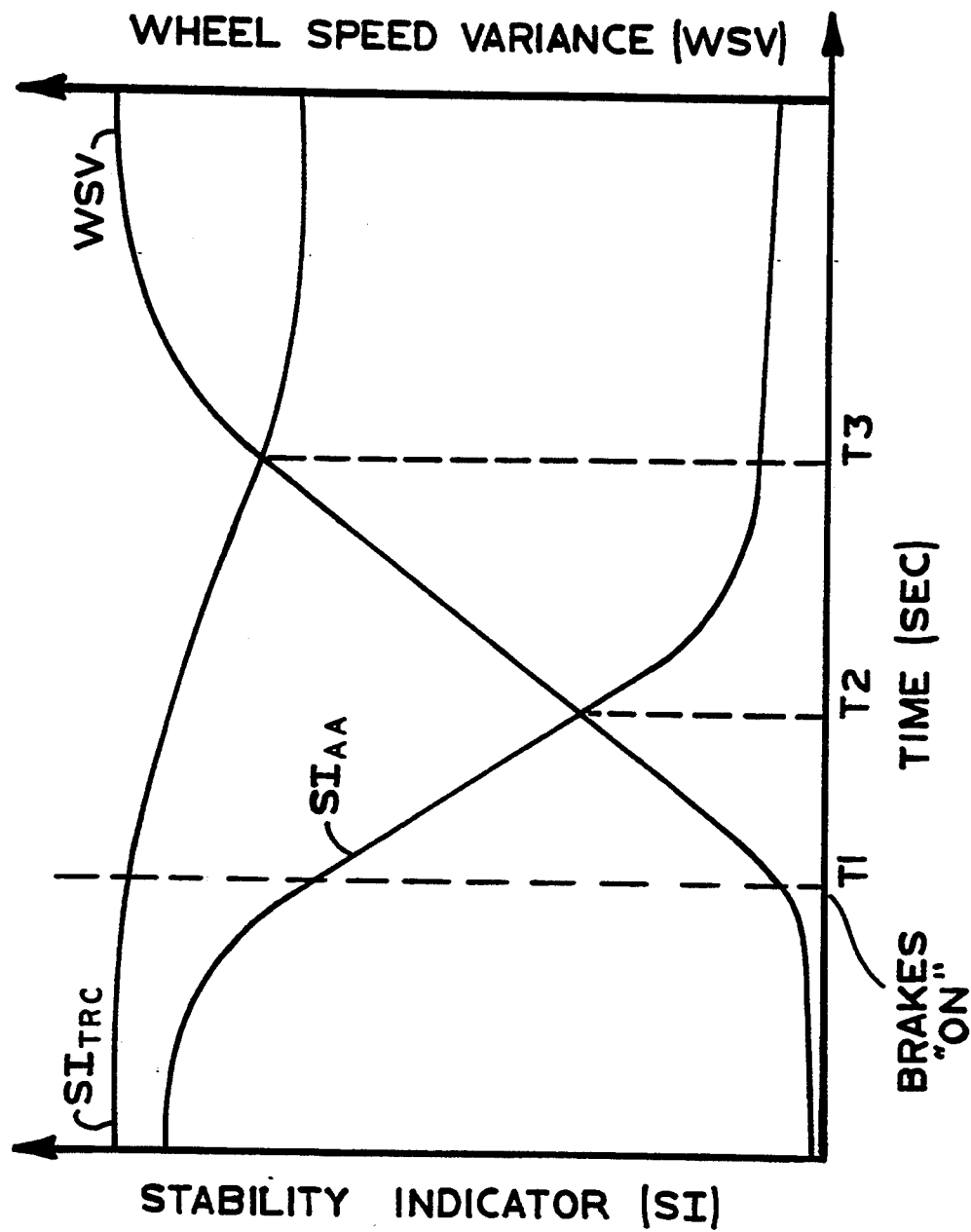
FIG. 6 is a graph of stability indicator (SI) and wheel speed variance (WSV), as a function of time, illustrating an important aspect of the system/method of the present invention.

The logic then proceeds to a decision block at which the present value of each of the stability indicators (SI) relating to the turning radius of curvature (TRC) is compared to the present value of wheel-speed variance (WSV). If the stability indicator (SI) relating to (TRC) is not greater than the wheel-speed variance ("NO"), the logic is exited. If the stability indicator is greater than the wheel-speed variance ("YES"), the logic then proceeds to a similar decision block in which the stability indicator relating to the articulation angle (AA) is compared to the wheel-speed variance (WSV). If the stability indicator is less than the wheel-speed variance ("YES"), the logic then proceeds to an operation of de-actuating the trailer brakes 17 through 123. Referring now to FIG. 6, in conjunction with FIG. 5, it may be seen that, as a function of time, the stability indicator (SI) relating to the articulation angle (AA) is decreasing rapidly (by way of example), whereas the stability indicator (SI) relating to the turning radius of curvature (TRC) is decreasing only at a much slower rate.

In accordance with an important aspect of the present invention, when the stability indicator ($SI_{AA}$) becomes less than the wheel speed variance (WSV), corrective action in the form of de-actuating the trailer brakes may be taken, with a greatly increased degree of confidence that the action has not been taken too soon or too late. Referring again to FIG. 6, it is preferable that the corrective action be taken between T2 (when the stability indicator ($SI_{AA}$) becomes less than the wheel speed variance (WSV)), and T3 (when the stability indicator ($SI_{TRC}$) becomes less than the wheel speed variance (WSV)). In other words, there is no reason to take the corrective action (de-actuating the trailer brakes) before T2, and if such corrective action is not taken before T3, it will probably be too late.

Referring still to FIG. 5, if the stability indicator ($SI_{AA}$) is not less than the wheel speed variance ("NO"), the logic may proceed either to an exit, or may be re-initialized to start at the beginning again. It should be apparent to those skilled in the art that the system and method of the present invention will, in connection with the various comparisons of the stability indicators and the wheel speed variance, require appropriate "scaling" of the indicators and the variance, in order that the comparisons will yield the desired results. Such scaling is believed to be well within the ability of those skilled in the art.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A trailer stability brake control method for an articulated vehicle of the type including a tractor and a trailer connected at an articulating connection, defining a pivot axis about which the trailer is pivotable relative to the tractor, an articulation angle (AA) of said vehicle being defined by the included angle defined by a longitudinally-extending axis of the trailer passing through said pivot axis relative to a longitudinally-extending axis of the tractor passing through said pivot axis; said tractor including at least first and second axles having at least first and second left wheels, and first and second right wheels; a tractor brake system including a tractor brake control means and a trailer brake system including a trailer brake control means, said control method characterized by:

(a) determining a value indicative of at least one of tractor turning radius of curvature (TRC) and a time derivative of tractor turning radius of curvature (dTRC/dt) for each of said first and second tractor axles;

(b) determining a value indicative of at least one of said articulation angle (AA) and a time derivative of said articulation angle (dAA/dt);

(c) determining a value (WSV) indicative of wheel speed variance ($WSV_L$) between said first and second left wheels, and of wheel speed variance ($WSV_R$) between said first and second right wheels;

(d) providing signal processing means to determine a value indicative of a stability indicator ($SI_T, SI_A$) for each of the values determined in steps (a) and (b) above, wherein each signal processing means includes filter means having a cut-off frequency ($\Omega_c$), the cut-off frequency is a function of wheel speed variance (WSV), such that, the cut-off frequency ($\Omega_c$) decreases as the wheel speed variance (WSV) increases, and vice-versa; and (e) de-actuating said trailer brake control means whenever said stability indicator ($SI_A$) for one of said articulation angle (AA) and said time derivative (dAA/dt) thereof becomes less than said wheel speed variance (WSV).

2. A trailer stability brake control method as claimed in claim 1, characterized by said step (d) further comprises providing said filter means with a gain factor (G) corresponding to each of said first and second left wheels and to each of said first and second right wheels, and varying the gain of each of said gain factors (G) generally in accordance with changes in wheel speed variance (WSV) of the corresponding wheel.

3. A trailer stability brake control method for an articulated vehicle of the type including a tractor and a trailer connected at an articulating connection (17), defining a pivot axis about which the trailer is pivotable relative to the tractor, an articulation angle (AA) of said vehicle being defined by the included angle defined by a longitudinally-extending axis of the trailer passing through said pivot axis relative to a longitudinally-extending axis of the tractor passing through said pivot axis; said tractor including at least first, second, and third axles having at least first, second, and third left wheels, and first, second, and third right wheels; a tractor brake system including a tractor brake control means and a trailer brake system including a trailer brake control means, said control method characterized by:

(a) determining a value indicative of at least one of tractor turning radius of curvature (TRC) and a time derivative of tractor turning radius of curvature (dTRC/dt) for each of said first, second, and third tractor axles;

(b) determining a value indicative of at least one of said articulation angle (AA) and a time derivative of said articulation angle (dAA/dt);

(c) determining a value (WSV) indicative of wheel speed variance ($WSV_L$) among said first, second, and third left wheels, and of wheel speed variance ($WSV_R$) among said first, second, and third right wheels;

(d) providing signal processing means to determine a value indicative of a stability indicator ($SI_T, SI_A$) for each of the values determined in steps (a) and (b) above, wherein each signal processing means includes filter means having a cut-off frequency ($\Omega_c$), the cut-off frequency is a function of wheel speed variance (WSV), such that, the cut-off frequency ($\Omega_c$) decreases as the wheel speed variance (WSV) increases, and vice-versa; and (e) de-actuating said trailer brake control means whenever said stability indicator ($SI_A$) for one of said articulation angle (AA) and said time derivative (dAA/dt) thereof becomes less than said wheel speed variance (WSV).

4. A trailer stability brake control method as claimed in claim 3, characterized by said step (d) further comprises providing said filter means with a gain factor (G) corresponding to each of said first, second, and third left wheels and to each of said first, second, and third right wheels, and varying the gain of each of said gain factors (G) generally in accordance with changes in wheel speed variance (WSV) of the corresponding wheel.

* * * * *